United States Patent [19]
Johannesen

[11] 3,977,499
[45] Aug. 31, 1976

[54] DISC BRAKE SHOE ANTI-RATTLE CLIP

[75] Inventor: Donald D. Johannesen, South Bend, Ind.

[73] Assignee: The Bendix Corporation, South Bend, Ind.

[22] Filed: Sept. 22, 1975

[21] Appl. No.: 615,644

Related U.S. Application Data

[63] Continuation of Ser. No. 483,996, June 28, 1974, abandoned.

[52] U.S. Cl. ............................................. 188/73.5
[51] Int. Cl.² ........................................ F16D 65/00
[58] Field of Search ................ 188/73.3, 73.4, 73.5, 188/73.6, 72.4, 205 A

[56] References Cited
UNITED STATES PATENTS

| | | | |
|---|---|---|---|
| 368,143 | 8/1887 | Fink | 188/205 A |
| 1,191,792 | 7/1916 | Jefferies | 188/205 A |
| 3,616,878 | 11/1971 | Girauldon | 188/73.5 |
| 3,638,765 | 2/1972 | Flaherty et al. | 188/73.5 |
| 3,712,423 | 1/1973 | Girauldon | 188/73.5 |
| 3,782,509 | 1/1974 | Cook et al. | 188/73.5 |

*Primary Examiner*—Stephen G. Kunin
*Assistant Examiner*—Edward R. Kazenske
*Attorney, Agent, or Firm*—Ken C. Decker; William N. Antonis

[57] ABSTRACT

An antirattle spring for a disc brake is disclosed in which the resilient or "working" portion of the spring is located away from the torque-taking elements of the brake. Consequently, the working portion of the spring does not have to take braking torque, and therefore is more likely to retain its resiliency than are prior art antirattle springs. The spring includes the working portion, and further includes a pair of complementary shaped legs extending from the working portion into the clearance between the torque transmitting portion of the friction element and the torque absorbing portion of the torque member.

2 Claims, 4 Drawing Figures

DISC BRAKE SHOE ANTI-RATTLE CLIP

This is a continuation of application Ser. No. 483,996, filed June 28, 1974, now abandoned.

BACKGROUND OF THE INVENTION

This invention relates to an antirattle spring for a disc brake of the same general type disclosed in U.S. Pat. No. 3,616,878.

A common disc brake design slidably mounts one of the usual friction elements directly on the torque-taking member. Since relative movement between the friction element and the torque-taking member when the vehicle upon which the brake is mounted traverses uneven terrain often results in noises which may be annoying to the vehicle occupants, it has become customary to provide an antirattle spring between the friction element and the torque member which restrains their relative movement. Such an antirattle spring must be of extremely simple design to permit its manufacture at a minimum cost, and must also be provided with means which prevents its accidental removal from between the torque member and the friction element during normal operation of the brake. The antirattle spring must be of sufficient resiliency that it may be compressed and relaxed for an indefinite number of cycles without losing its resiliency. It also must not interfere in any substantial way with the normal operation of the brake.

SUMMARY OF THE INVENTION

Therefore, an important object of my invention is to provide an antirattle spring for a disc brake of extremely simple design which permits its manufacture at a minimum cost.

Another important object of my invention is to provide an anti-rattle spring which cannot be accidentally displaced from its normal position during operation of the brake.

Another important object of my invention is to provide an anti-rattle spring which does not interfere with the normal operation of the brake.

Another important object of my invention is to provide an anti-rattle spring in which the resilient or working portion of the spring is located away from the torque-taking members and consequently is not appreciably deformed by braking torques.

DETAILED DESCRIPTION

Figure 1:
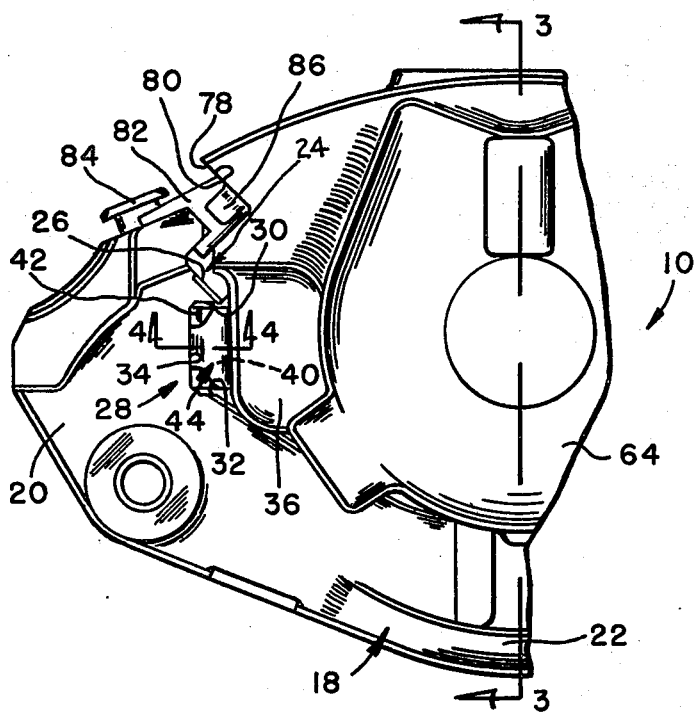
FIG. 1 is a fragmentary side elevational view of a disc brake assembly having an antirattle spring made pursuant to the teachings of my present invention.

Referring now to the drawings, a brake assembly generally indicated by the numeral 10 includes a rotor 12 having opposed friction faces 14 and 16. A torque member generally indicated at 18 includes a pair of circumferentially spaced arms 20 and 22 which define a recess 24 therebetween. Each of the arms 20 and 22 defines an inner edge 26 having a notch, the notch defined by the arm 20 being generally indicated by the numeral 28. Notch 28 includes an upper edge 30, a lower edge 32, and a vertically extending edge 34 which interconnects the edges 30 and 32.

Brake assembly 10 further includes a first friction element 36 disposed adjacent the friction face 14 and a second friction element 38 disposed adjacent the friction face 16. The friction element 36 is provided with a projection 40 extending from the end thereof, which is received in the corresponding notch 28 on the torque member 18, thereby slidably mounting the friction element 36 for movement toward and away from the friction face 14. The projection 40 is provided with a vertically extending edge 42 which extends generally parallel to the edge 34 of the notch 28. Another projection (not shown) extends from the opposite edge of friction element 36.

An antirattle spring generally indicated by the numeral 44 is disposed between the edge 34 of notch 28 and the edge 42 of projection 40. Spring 44 includes a loop-shaped body portion 46 which presents a pair of edges 48, 50 from which legs 52, 54 extend. The leg 52 includes portions 56, 58 which extend substantially parallel to one another and which are interconnected by connecting portion 60. The portions 56, 58, and 60 define a recess which receives the end of the projection 40, and a detent 61 projects from edge 48 into the recess and is adapted to frictionally engage the friction element to prevent displacement of the latter from the recess. Edge 50 is tapered, so that the width of leg 54 is substantially less than the width of the leg 52. An aperture 63 is defined in the leg 52 and is sufficiently wide to receive the leg 54.

The friction elements 36 and 38 are urged into frictional engagement with their corresponding friction faces 14 and 16, respectively, by an actuating member or caliper generally indicated by the numeral 62. The caliper 62 includes a housing 64 defining a bore 66 therewithin which slidably receives an actuating piston 68. One end of the piston 68 cooperates with the end of the bore 66 to define a variable volume fluid chamber 70 therebetween. The other end of the piston 68 operatively engages the friction element 36. When a brake application is effected, pressurized fluid developed in the vehicle's master cylinder (not shown) is admitted into the variable volume chamber 70 through an inlet port 72.

Caliper 62 further includes a bridge portion 74 which extends across the periphery of the rotor 12, and a radially inwardly extending portion 76 which is disposed adjacent the friction face 16 and which carries the friction element 38. The caliper 62 is slidably mounted on the torque member 18 by elongated bearing surfaces which extend generally parallel to the axis of rotation of rotor on opposite sides of the bridge portion 74. As illustrated in FIG. 1, one of the bearing surfaces 78 slidably engages the corresponding bearing surface 80 on a key 82 which is releasably held on the arm 20 by a thumbscrew 84. An antirattle spring 86 is disposed between the key 82 and the bearing surface 78 to restrict relative movement between the caliper 62 and the torque member 18. The other bearing surface (not shown) slidably engages a corresponding bearing surface carried directly by the arm 22. This feature greatly simplifies servicing of the brake, since the caliper may be removed from the torque member 18 by merely releasing the thumbscrew 84 and removing the key 82.

MODE OF OPERATION

Figure 2:
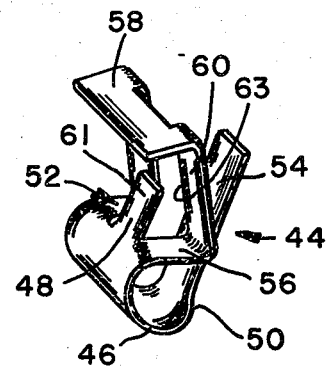
FIG. 2 is an enlarged, perspective view of the antirattle spring used in the brake assembly illustrated in FIG. 1.

When the brake 10 is assembled, the projection 40 on friction element 36 is inserted into the recess on the antirattle spring 44 defined by the portions 56, 58 and 60. The detent 61 frictionally engages the side of the friction element, to prevent accidental displacement of the antirattle spring 44 from the friction element 36. The assembly consisting of the friction element 36 and the antirattle spring 44 is then installed in the recess 24 defined between the arms 20 and 22. It will be noted that when the friction element is disposed in the recess 24, the arms 52, 54 are located in the gap defined between the vertical edge 42 of projection 40 and the vertical edge 34 of notch 28. However, the body portion 46 of spring 44 will not be disposed in this gap, so that the body portion 46 will not have to absorb forces generated by movement of friction element 36 toward the arm 20. When the brakes of the vehicle are released, the resiliency of the working portion 46 urges the legs 52, 54 apart, as illustrated more clearly in FIGS. 1 and 2. Of course, this action exerts a biasing force on the friction element 36 to restrain relative movement of the latter with respect to the torque member 18, thereby preventing generation of annoying noises.

Figure 4:
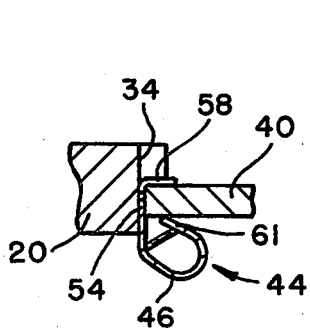
FIG. 4 is a fragmentary cross-sectional view taken substantially along line 4—4 of FIG. 1.
Figure 3:
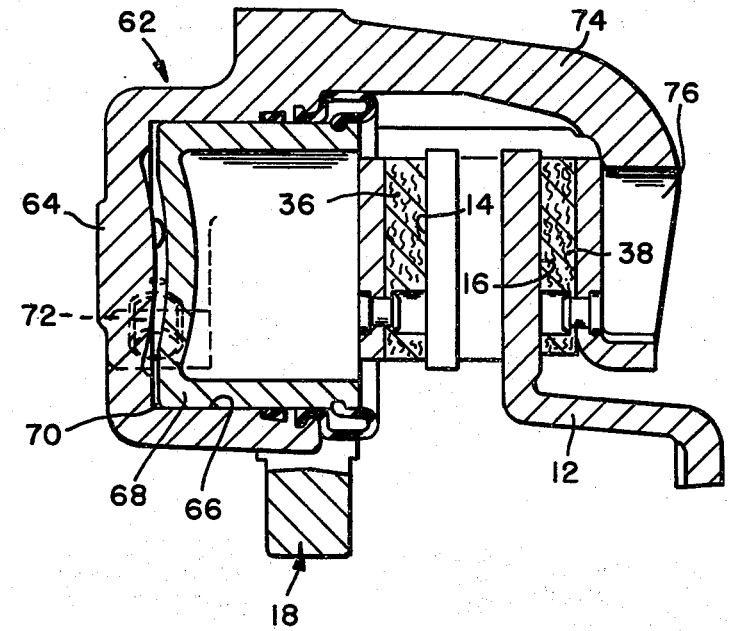
FIG. 3 is a cross-sectional view taken substantially along line 3—3 of FIG. 1.

When a brake application is effected, pressurized fluid is admitted into the chamber 70 and urges the piston 68 to the right viewing FIG. 3. Since the friction element 36 is operatively connected to the piston 68, movement of the piston will also urge the friction element 36 into engagement with the friction face 14. Since the caliper 62 is slidably mounted on the torque member 18, fluid pressure in the chamber 70 will also exert a reaction force on the caliper, which acts through the bridge portion 74 and inwardly extending portion 76 to urge the friction element 38 into engagement with its friction face 16. If the vehicle is traveling in the forward direction, the friction member 36 will anchor against the edges of the notch (not shown) carried by the arm 22. However, if the vehicle is traveling in the reverse direction when a brake application is effected, the projection 40 will move toward the edge 34 of the notch 28, thereby driving the leg 52 toward the leg 54 and stressing the body portion 46. As is illustrated in FIG. 4, the aperture 63 is large enough to accommodate the leg 54, so that the legs 52 and 54 do not overlap when the friction element 36 moves into anchoring engagement with the arm 20. Of course, the anchoring forces are transmitted through the legs 52 and 54 from projection 40 to the edge 34.

I claim:

1. In a disc brake having a rotor including a pair of opposed friction faces, a torque member disposed adjacent said rotor and having a pair of opposed inner edges, a friction element slidably mounted on said torque member, said friction element having torque transmitting portions adjacent each of said inner edges, one of said torque transmitting portions cooperating with its corresponding inner edge to define a gap therebetween during a brake application while the rotor is rotating in one direction and closing said gap to transmit torque to the torque member through said one torque transmitting portion and the corresponding inner edge during a brake application while the rotor is rotating in the opposite direction, means for urging said friction element into braking engagement with its corresponding friction face; and antirattle means including a resilient sheet metal body portion defining a loop located out of said gap, said loop having an axis and a pair of edges, said axis and said edges extending substantially parallel to the corresponding inner edge of the torque member, a pair of substantially flat, homogeneous sheet metal legs extending from corresponding ones of said edges into said gap whereby the resiliency of said body portion spreads said legs so that one of said legs engages said one inner edge and the other of said legs engages the corresponding torque transmitting portion to restrain rattling movement of the friction element when the brake is released, said other leg terminating in a section extending substantially parallel to said torque transmitting portion and perpendicular to the rest of said other leg and cooperating with said loop to define a recess receiving said torque transmitting portion of the friction element, said other leg defining an opening receiving said one leg when said torque transmitting portion moves toward said corresponding inner edge whereby braking torque is transmitted through both of said legs during braking when the rotor is rotating in the opposite direction.

2. In a disc brake having a rotor including a pair of opposed friction faces, a torque member disposed adjacent said rotor and having a pair of opposed inner edges, a friction element slidably mounted on said torque member, said friction element having torque transmitting portions adjacent each of said inner edges, one of said inner edges cooperating with the corresponding torque transmitting portion of said friction element to define a gap therebetween, actuating means for urging said friction element into engagement with a corresponding friction face, and antirattle means comprising a resilient body portion having a pair of edges, a pair of substantially flat legs, the width and length of said legs being substantially greater than their thickness, one of said legs extending from each of said edges, the resiliency of said body portion yieldably urging said legs apart, both of said legs extending into said gap, one of said legs bearing against said one inner edge, the other leg bearing against the corresponding torque transmitting portion of said friction element, so that said legs transmit the resiliency of said body portion to yieldably urge said friction element away from said one inner edge, said body portion being located out of said gap, one of said legs including means for securing the latter on said torque-transmitting portion of said friction element, said last-mentioned means including means defining a recess receiving one end of said torque-transmitting portion, and a detent extending into said recess to frictionally engage said friction element.

* * * * *